Patented Nov. 18, 1941

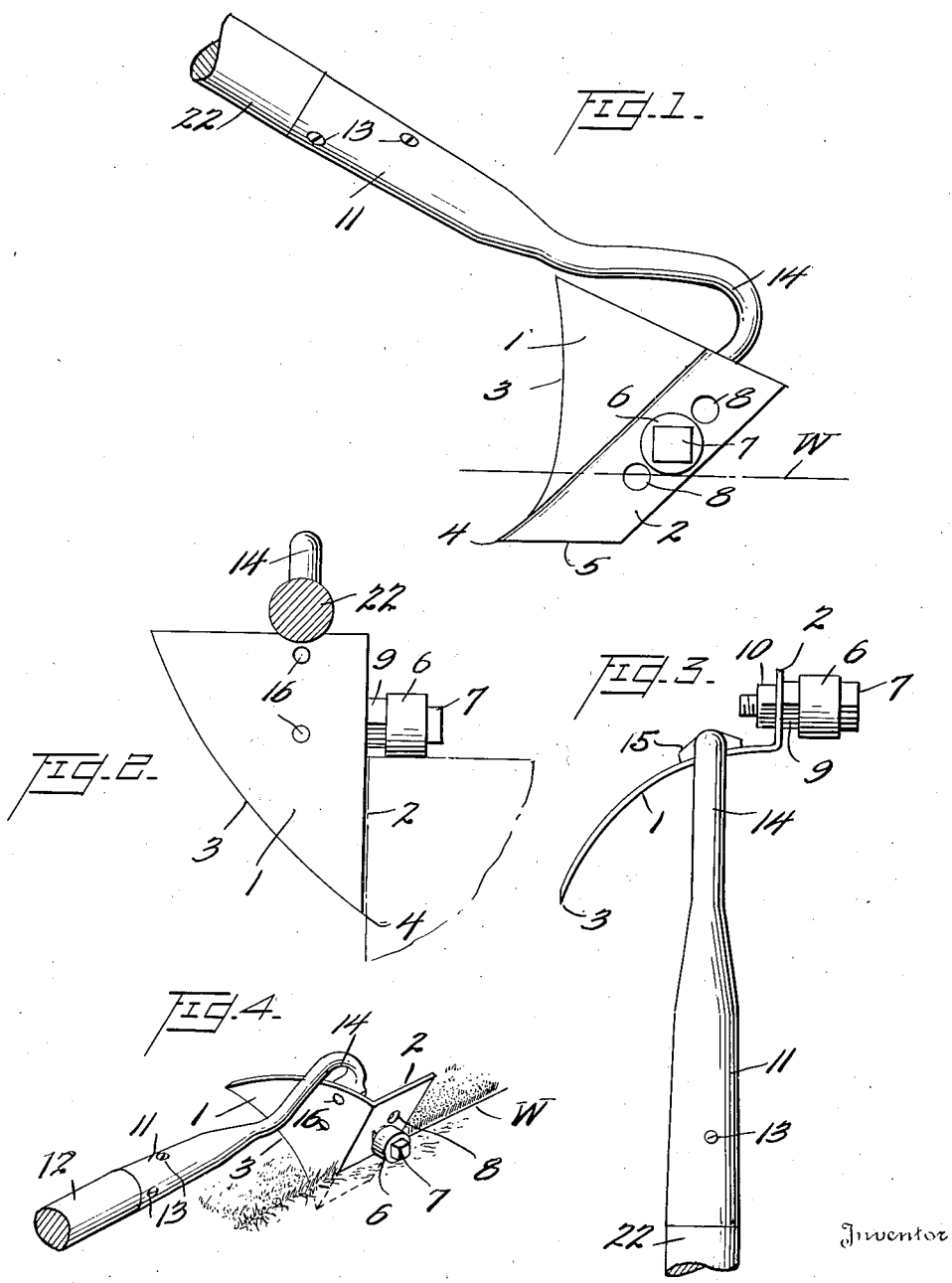

2,263,491

UNITED STATES PATENT OFFICE 2,263,491

LAWN TRIMMER

Max M. Glowe, Kinsman, Ohio

Application April 21, 1941 Serial No. 389,681

2 Claims. (Cl. 97—227)

This invention relates to lawn trimmers designed for edging up lawns along the sides of walks.

An important object of my invention is to provide a lawn trimmer of simple and economical construction but which, at the same time, is capable of trimming the edges of lawns in a neat and efficient manner.

Other objects and advantages will be apparent from the following detailed description of a preferred embodiment of my invention, reference being had to the accompanying drawing in which:

Figure 1 is a side view of a lawn trimmer;

Figure 2 is a front view of the lawn trimmer taken at right angles to the view of Fig. 1;

Figure 3 is a top view of the lawn trimmer; and

Figure 4 indicates the manner in which the lawn trimmer is adapted to operate in practice.

The lawn trimmer illustrated in Fig. 1 is composed essentially of a single sheet of heavy metal stock cut and stamped to shape so as to provide a blade 1 and a flat guide plate 2 extending rearwardly therefrom at approximately right angles. The blade 1 is curved in the direction of its width, as shown in the drawing, so as to provide a concave forward face. This blade terminates in a sharpened cutting edge 3 extending diagonally downwardly from the straight top edge of the blade to a point 4 along the corner of intersection of the blade with the guide plate. The lower edge of the guide plate is also cut off at at angle, but inclined oppositely to that of the cutting edge 3, to increase the sharpness of the point 4 so that it may more readily penetrate the ground.

The guide plate is adapted to flatly engage the side wall of a walk W (indicated in phantom lines) so as to guide the lawn trimmer in a straight line parallel to the walk and prevent the blade from twisting. Supporting the trimmer is a roller 6 rotatably mounted upon the shank of a bolt 7 extending through one of a series of openings 8 provided in the guide plate. A nut 9 is threaded onto the bolt 7 and serves as a spacer member for the roller. A clamping nut 10 is threaded upon the end of the bolt which projects beyond the guide plate, and this clamping nut in cooperation with the nut 9 secures the roller in place in a plane parallel to the walk-engaging face of the guide plate. The holes 8 are located at different elevations so as to admit of selective vertical adjustment of the roller, depending upon the depth of the furrow to be formed or to take care of variations in height of different walks above the lawn level.

Connected to and extending forwardly from the upper margin of the blade 1 is a ferrule 11 adapted to receive a handle member 12 which is secured to the ferrule by rivets 13. The closed end of the ferrule is extended to form a gooseneck 14, the end of which is expanded, as indicated at 15, and rigidly secured by rivets 16 to the blade.

When a lawn is to be trimmed with the device described above, the trimmer is positioned alongside the edge of the walk with the roller resting upon the walk and the guide plate 2 flatly contacting the lateral face of the walk. As the trimmer is pulled along by means of the handle 22, the pointed and concavely curved blade 1 will plow into the ground to the depth permitted by the roller 6 and deflect the dirt onto the walk in the manner illustrated in Fig. 4. The cutting edge 3 of the blade makes a clear-cut incision into the soil and also trims away the turf in an even line. Because the discharge side of the blade is entirely unobstructed, the plowed up dirt is deflected without interference onto the walk where it may be swept up and suitably disposed of.

My lawn trimmer is light, simple and cheap in construction, and lends itself to manufacture by quantity production methods. Manifestly the form of the device described above is subject to modification by those skilled in the art without departing from the nature and principle of my invention as defined by the following claims.

I claim:

1. A device for trimming lawns adjacent the sides of a walk comprising an earth-engaging blade, a guide plate extending rearwardly at approximately right-hangles from the inner edge of the blade and adapted to contact a side of the walk, a handle extending forwardly from the upper edge of the blade, and a roller pivotally mounted upon the guide plate for contacting the upper surface of the walk, said blade having its forward face curved in the direction of its width so as to direct the dirt ploughed up by the blade toward the walk, the outer edge of the blade being sharpened and extending diagonally downwardly and toward the inner edge of the blade so as to form a plough point with the lower edge of the guide plate.

2. A device for trimming lawns adjacent the sides of a walk comprising a sheet metal earth-engaging blade, a sheet metal guide plate extending rearwardly at approximately right-angles from the inner edge of the blade and adapted to contact a side of the walk, said blade and guide plate being of integral one-piece construction, a handle extending forwardly from the upper edge of the blade, and a roller pivotally mounted upon the guide plate and adjustable in a vertical direction for contacting the upper surface of the walk, said blade being curved in the direction of its width so as to direct the dirt ploughed up by the blade toward the walk, the outer edge of the blade being sharpened and extending diagonally downwardly and toward the inner edge of the plate so as to form a plough point with the lower edge of the guide plate.

MAX M. GLOWE.